US012783947B2

(12) United States Patent
Straehle et al.

(10) Patent No.: US 12,783,947 B2
(45) Date of Patent: Nov. 3, 2026

(54) DEVICE AND METHOD FOR DETECTING ANOMALIES IN TECHNICAL SYSTEMS

(71) Applicant: Robert Bosch GmbH, Stuttgart (DE)

(72) Inventors: Christoph-Nikolas Straehle, Weil der Stadt (DE); Robert Schmier, Heidelberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 688 days.

(21) Appl. No.: 18/297,732

(22) Filed: Apr. 10, 2023

(65) Prior Publication Data

US 2023/0351262 A1 Nov. 2, 2023

(30) Foreign Application Priority Data

May 2, 2022 (EP) .................................... 22171094

(51) Int. Cl.
*G06F 7/00* (2006.01)
*G06N 20/00* (2019.01)

(52) U.S. Cl.
CPC .................................... *G06N 20/00* (2019.01)

(58) Field of Classification Search
CPC ...................................................... G06N 20/00
USPC ..................................... 707/600-899; 706/12
See application file for complete search history.

(56) References Cited

U.S. PATENT DOCUMENTS 11,537,813 B1 * 12/2022 Kviatkovsky .......... G06V 10/82
2022/0108184 A1 4/2022 Neumann et al.

FOREIGN PATENT DOCUMENTS

EP 3879356 A1 9/2021
WO 2021247962 A1 12/2021

OTHER PUBLICATIONS

Ren et al., "Likelihood Ratios for Out-of-Distribution Detection," 33rd Conference on Neural Information Processing Systems (NEURIPS 2019), Vancouver, Canada, 2019, pp. 1-12. <https://proceedings.neurips.cc/paper/2019/file/1e79596878b2320cac26dd792a6c51c9-Paper.pdf> Downloaded Apr. 6, 2023.

(Continued)

*Primary Examiner* — Isaac M Woo
(74) *Attorney, Agent, or Firm* — NORTON ROSE FULBRIGHT US LLP

(57) ABSTRACT

Computer-implemented method for training a machine learning system. The machine learning system is configured to determine an output signal characterizing a likelihood of an input signal. The training includes: obtaining a first training input signal and a second training input signal, wherein the first training input signal characterizes an in-distribution signal and the second training input signal characterizes a contrastive signal; determining, by the machine learning system, a first output signal characterizing a likelihood of the first training input signal and determining, by the machine learning system, a second output signal characterizing a likelihood of the second training input signal; determining a loss value, wherein the loss value characterizes a difference between the first output signal and the second output signal; training the machine learning system based on the loss value.

19 Claims, 8 Drawing Sheets

(56) References Cited

OTHER PUBLICATIONS

He et al., "Momentum Contrast for Unsupervised Visual Representation Learning," Conference: 2020 IEEE/CVF Conference on Computer Vision and Pattern Recognition (CVPR), 2020, pp. 9729-9738. <https://openaccess.thecvf.com/content_CVPR_2020/papers/He_Momentum_Contrast_for_Unsupervised_Visual_Representation_Learning_CVPR_2020_paper.pdf> Downloaded Apr. 6, 2023.

* cited by examiner

DEVICE AND METHOD FOR DETECTING ANOMALIES IN TECHNICAL SYSTEMS

CROSS REFERENCE

The present application claims the benefit under 35 U.S.C. § 119 of European Patent Application No. EP 22 17 1094.0 filed on May 2, 2022, which is expressly incorporated herein by reference in its entirety.

BACKGROUND INFORMATION

Ren et al. "Likelihood Ratios for Out-of-Distribution Detection", 2019, https://arxiv.org/pdf/1906.02845.pdf describes a method for anomaly detection by means of a likelihood ratios test.

He et al. "Momentum Contrast for Unsupervised Visual Representation Learning", 2020, Comp. Soc. Conf. on Computer Vision and Pattern Recognition, https://openaccess.thecvf.com/content CVPR 2020/papers/He_Momentum_Contrast_for_Unsupervised_Visual_Representation_Learning_CVPR_2020paper.pdf describes a method for unsupervised training of a neural network.

Detecting whether an operation is normal or subject to an anomaly is a recurring problem for a variety of technical system. Robots typically need to determine, whether a perceived environment poses an anomaly with respect to known environments, operation of machines such as engines need to determine whether the operation is in a normal state or not, and automated medical analysis systems need to determine whether a scan of a patient exhibits anomalous characteristics.

Conventional methods typically employ machine learning systems to determine whether signals (e.g., sensor signals describing an environment of a technical system or an internal state of a technical system) can be considered normal or anomalous. Typically, these machine learning systems are trained with a dataset known as in-distribution dataset and optionally a second dataset known as contrastive dataset. An in-distribution dataset comprises data that is considered as characterizing normal signals, e.g., signals known to occur during normal operation of the technical system. In contrast, a contrastive dataset is considered as characterizing anomalous data (sometimes also referred to as out-of-distribution data). Anomalous data may be data that was simply not witnessed during normal operation of the technical system. Additionally, data can be considered anomalous if the data was witnessed during anomalous operation of the technical system (e.g., the technical system was broken, was close to being broken, or did not behave as desired). It should be noted that the data comprised in the contrastive dataset may not characterize all out-of-distribution data, i.e., there may be more anomalous data outside of the contrastive dataset.

A standard approach for determining whether a signal is anomalous or not is then to first determine an in-distribution model trained on an in-distribution dataset and a contrastive model trained on contrastive data. The signal is then fed to each model, thereby determining a likelihood for the in-distribution model (i.e., with respect to the in-distribution data) and a likelihood for the contrastive model (i.e., with respect to the contrastive data). Given these two likelihood values for the signal, the approach by Ren et al. then proposes to determine a ratio between the two values in order to determine whether the input signal characterizes an anomaly or not. In order to do so, the output of the contrastive model is used in the denominator of the ratio.

However, the inventors discovered that this approach is limited in case of signals that are neither close to the in-distribution data nor to the contrastive data. In these cases, the ratio is ill defined as the division of two small numbers close to zero can either be very large or very small depending on random influences of the learned models. The method is hence inaccurate for these kinds of signals.

SUMMARY

An advantage of the method according to the present invention is that a machine learning system can be trained for anomaly detection, wherein the machine learning system is configured to provide for accurate detection of anomalies even for signals that are fare away from any in-distribution data or out of distribution data. Advantageously, the model achieves this by learning a density that characterizes a normalized difference between a density of in-distribution data and a density of contrastive data.

In a first aspect, the present invention concerns a computer-implemented method for training a machine learning system, wherein the machine learning system is configured to determine an output signal characterizing a likelihood of an input signal ($x$). According to an example embodiment of the present invention, the training includes the following steps:

Obtaining (701) a first training input signal ($x_1$) and a second training input signal ($x_2$), wherein the first training input signal ($x_1$) characterizes an in-distribution signal and the second training input signal ($x_2$) characterizes a contrastive signal;

Determining (702), by the machine learning system (60), a first output signal ($y_1$) characterizing a likelihood of the first training input signal ($x_1$) and determining, by the machine learning system (60), a second output signal ($y_2$) characterizing a likelihood of the second training input signal ($x_2$)

Determining (703) a loss value, wherein the loss value characterizes a difference between the first output signal ($x_1$) and the second output signal ($x_2$);

Training (704) the machine learning system (60) based on the loss value.

An input signal may be understood as data arranged in a predefined form, e.g., a scalar, a vector, a matrix, or a tensor. Preferably, an input signal characterizes data obtained from one or multiple sensors, i.e., an input signal comprises sensor data. The method is generally capable to deal with any kind of input signal as the advantage of the method is not restricted to a certain kind of input signal. The input signal may hence be a sensor signal obtained from, e.g., a camera, a lidar sensor, a radar sensor, an ultrasonic sensor, a thermal camera, a microphone, a piezo sensor, a hall sensor, a thermometer, or any other kind of data. The input signal may characterize sensor readings that characterize a certain point in time (e.g., image data) as well as a time series of sensor readings combined into a single signal. The input signal May also be an excerpt of a sensor measurement or a plurality of sensor measurements. The input signal may also be a plurality of sensor signals, e.g., signals from different sensors of the same type and/or signals from different types of sensors. All of these embodiments can hence be considered to be comprised in the phrase "the input signal may be based on a sensor signal".

The output signal characterizing a likelihood may be understood as the output signal being or comprising a value that represents a likelihood of the input signal. The value may be understood as likelihood value or density value of the input signal (both terms are understood to be synonymous). As the output signal characterizes a likelihood of the input signal, the output signal may alternatively be understood as comprising or being a value from which a likelihood of the output signal can be derived. For example, the output signal may be or may comprise a log likelihood of the input signal or a negative log likelihood of the input signal.

According to an example embodiment of the present invention, the machine learning system may be considered to be a model from the field of machine learning. Alternatively, the machine learning system may be understood as a combination of a plurality of modules preferably with a model from the field of machine learning as one of the modules. The machine learning system is configured to accept the input signal as input and provide an output signal, wherein the output signal characterizes a likelihood of the input signal.

Training may especially be understood as seeking to optimize parameters of the machine learning system in order to minimize the loss value given the first training input signal and the second training input signal.

Preferably, training may be conducted iteratively, wherein in each iteration a first training input signal is drawn at random from an in-distribution dataset and a second training input signal is drawn at random from a contrastive dataset.

For training, the first input training signal and the second training input signal are obtained. Both signals may be considered datapoints. The first training input signal characterizes an in-distribution signal. That is, the first training input signal may be understood as a sample of a signal that can be considered normal, i.e., in-distribution. In contrast, the second training input signal characterizes a contrastive signal. That is, the second training input signal may be understood as a sample of a signal that is considered anomalous. In the following, the terms signal and sample may be understood and used interchangeably.

In-distribution signals may be understood as samples from an in-distribution with probability density function p(x), wherein contrastive signals may be understood as samples from some other distribution than the in-distribution (a probability density function of this other distribution will also be referred to as q(x)).

As the distributions themselves can rarely be obtained analytically, a distribution may be characterized by a dataset of samples obtained from the distribution. For example, an in-distribution dataset comprises signals which are considered normal. Conversely, a contrastive dataset comprises signals that are considered anomalous.

The method for training advantageously allows the machine learning system to learn a distribution $p'(x)=c\cdot(p(x)-q(x))$, wherein c is a constant value. In other words, the machine learning system learns a density, which is a normalized difference of p(x) and q(x) where the difference is greater than 0, and zero where it is smaller.

Advantageously, the density p' learned by the machine learning system is well defined in areas where p(x) and q(x) are very small, i.e., where the in-distribution data and the contrastive data is sparse. The inventors found that this is because p' is a normalized density, which integrates to 1. Thus, in the areas where both distributions p(x) and q(x) have no support it is 0 or almost zero. Thus, when comparing a density value p'(x) for an input signal x to a threshold to see whether it is an inlier (input signal is considered in distribution if the density value is equal to or above the threshold) input signals outside of the support of p(x) and q(x) will be reliably detected as anomalies.

Training based on the loss value may be understood as adapting parameters of the machine learning system such that for another input of the first training input signal and the second training input signal the loss value becomes less. Common approaches may be used here, e.g., gradient descent-based approaches such as stochastic gradient descent or evolutionary algorithms. In fact, as long as an optimization procedure seeks to minimize a loss value, the procedure can be used in the proposed method for training the machine learning system.

According to an example embodiment of the present invention, the proposed method may be run iteratively, i.e., the steps of the method may be run for a predefined amount of iterations or until the loss value is equal to or below a predefined threshold or if an average loss value of a validation dataset obtained based on the machine learning system is equal to or below a predefined threshold.

In preferred environments the loss value is determined by

Determining a plurality of first output signals is for a corresponding plurality of first training input signals;

Determining a plurality of second output signals for a corresponding plurality of second training input signals;

Determining the loss value based on a difference of a mean of the plurality of first output signals and a mean of the plurality of second output signals as loss value.

In other words, in preferred embodiments of the present invention, the loss value is based on more than one first training input signal and more than one second training input signal. Advantageously, using a plurality of first and second training input signals allows for better statistics about p(x) and q(x) in each training step. Especially for gradient based trainings, this leads to less noisy gradients and hence a faster and more stable training, i.e., divergence of the training can be mitigated.

As loss value, the difference may be provided directly. Alternatively, it is also possible to scale or offset the difference before providing it as loss value.

From a mathematical point of view, the loss value is preferably determined according to a loss function, wherein the loss function is characterized by the formula $$L = \frac{1}{n}\sum_{i=1}^{n}\left[-\log p_\theta\left(x_1^{(i)}\right)\right] - \frac{1}{m}\sum_{j=1}^{m}\left[-\log p_\theta\left(x_2^{(j)}\right)\right],$$

wherein n is the amount signals in the plurality of first training inputs signals, m is the amount of signals in the plurality of second training input signals, $p_\theta(\cdot)$ indicates performing inference on the machine learning system parametrized by parameters θ for an input signal (i.e., determining a likelihood of the input signal by means of the machine learning system), $$x_1^{(i)}$$

is the i-th signal from the plurality of first training input signals, and $$x_2^{(j)}$$

is the j-the signal from the plurality of second training input signals.

During training, the term $$p_\theta(x_2^{(j)})$$

may tend to zero as the machine learning system learns to assign contrastive signals to values close to zero. This may lead to the last term becoming infinitely large. Hence, in preferred embodiments, the term $$p_\theta(x_2^{(j)})$$

may preferably be compared to a predefined threshold and be set to the threshold if the term is below the predefined threshold. The threshold may be understood as a hyperparameter of the method.

In preferred embodiments of the present invention, the second training input signal may be obtained by augmenting the first training input signal. If a plurality of second training input signals is used, each first training input signal may be used for determining a second training input signal by means of augmentation.

Augmentation may be understood as an operation from the field of machine learning for determining a new signal from an existing signal. As the second training input signal is understood to characterize an anomalous signal, the augmentation used in these preferred embodiments should preferably introduce modifications to the first input signal that are strong enough to shift the in-distribution signal to an (assumed) contrastive signal. It would, for example be possible to define a threshold indicating a distance which has to be surpassed in order to turn an in-distribution signal into an out of distribution signal. The first training input signal could then be processed by one or multiple augmentation operations until the threshold is surpassed.

Advantageously, obtaining the second training input signal from the first input signal by means of augmentation allows for unsupervisedly generating the contrastive data, i.e., on the fly. The contrastive data does hence not need to be collected before training, which leads to a speed up in training. Additionally, expert knowledge can be encoded into the augmentation operations applied to the first training input signal concerning which transformation (i.e., augmentation) turns an in-distribution signal into a contrastive signal.

In preferred embodiments of the present invention, the machine learning system comprises a feature extraction module, which is configured to determine a feature representation from an input signal provided to the machine learning system and a corresponding output signal is determined based on the feature representation extracted for the respective input signal.

An input signal provided to the machine learning system may be understood as datum for which a feature representation in the sense of machine learning can be extracted. Preferably, the feature extraction module is characterized by a neural network, which accepts an input signal as input and provides a feature representation as output.

The inventors found that using a feature extraction module allows for determining suitable features for determining the output signal. Parameters of the feature extraction module may especially be frozen during training of the machine learning system, thereby increasing the speed of training of the machine learning system even further. The feature extraction module may also be "borrowed" from other parts of a technical system that employs the machine learning system for anomaly detection. For example, the technical system may detect objects in an environment of the technical system by means of a neural network. Parts of this neural network may also be used as feature extraction module. This allows for determining feature representations, which are meaningful with respect to the task of object detection.

The inventors further found that a neural network obtained according to the MOCO training paradigm works well as a feature extraction module.

According to an example embodiment of the present invention, Preferably, as part of the training method the feature extraction module is trained to map similar input signals to similar feature representations.

Advantageously, mapping similar input signals to similar output signals allows for obtaining consistent output signals from the machine learning system with respect to subtle difference in input signals and acts as a measure for regularization. The inventors found that this improves the performance of the machine learning system even further.

According to an example embodiment of the present invention, preferably, the feature extraction module may be trained to minimize a loss function, wherein the loss function is characterized by the formula:

$$L_2 = -\log\frac{\exp\left(\frac{sim(f_0, f_1)}{\tau}\right)}{\sum_{i=1}^{n}\exp\left(\frac{sim(f_0, f_i)}{\tau}\right)},$$

wherein $f_0$ and $f_1$ are feature representations which shall be close in feature space, $f_i$ is an i-th feature representation of a plurality of n feature representations that shall not be close to $f_0$, and $\tau$ is a hyperparameter. The function sim is a similarity function for measuring a similarity between two feature representations. Preferably, the cosine similarity may be used as similarity function but any other function characterizing a similarity between two data points would be suitable as well.

The feature representation $f_0$ may be obtained from $f_1$ by a slight modification, e.g., a slight augmentation that does not shift $f_0$ further from $f_1$ than a predefined threshold. The feature representations $f_i$ (including $f_1$) may be feature representations determined form the feature extraction module for a corresponding plurality of input signals. Alternatively, $f_0$ may be a feature representation obtained for a first input signal and $f_1$ a feature representation for a second input signal, wherein the first input signal and second input signal are determined as close (e.g., according to a similarity metric such as the cosine similarity).

In preferred embodiments of the method of the present invention, the machine learning system is a neural network, for example, a normalizing flow or a variational autoencoder or a diffusion model, or wherein the machine learning system comprises a neural network, wherein the neural network is configured to determine an output signal based on a feature representation.

If no feature extraction module is used, the neural network may be used in an end-to-end approach for accepting input signals and determining output signals. Alternatively, if the machine learning system comprises a feature extraction module, the neural network may be a module of the machine learning system, which takes input from the feature extraction module and provides the output signal.

The inventors found that a neural network improves the performance of the machine learning system even further.

In some embodiments of the method of the present invention, the steps of the method are repeated iteratively, wherein in each iteration the loss value characterizes either the first output signal or a negative of the second output signal and training comprises at least one iteration in which the loss value characterizes the first output signal and at least one iteration in which the loss value characterizes the second output signal.

These embodiments characterize a variant of the method in which training may be conducted in each step based on either in-distribution signals or contrastive signals. This may be understood as similar to training generative adversarial networks by alternating training of a discriminator and generator of a generative adversarial network. However, in the method training may be alternated in each iteration between in-distribution signals and contrastive signals. This may be understood as an alternative way to conduct the method. However, it may also increase the performance of the machine learning system as the added stochasticity of training only with in-distribution signals or contrastive signals in a single step may regularize training.

In another aspect, the present invention concerns a computer-implemented method for determining whether an input signal is anomalous or normal. According to an example embodiment of the present invention, the method comprises the following steps:

- Obtaining a machine learning system, wherein the machine learning system has been trained according to the training method proposed above;
- Determining an output signal based on the input signal by means of the machine learning system, wherein the output signal characterizes a likelihood of the input signal;
- If the likelihood characterized by the output signal is equal to or below a predefined threshold, determine the input signal as anomalous, otherwise determining the input signal as normal.

Obtaining a machine learning system according to the training method proposed above may be understood as conducting the training method as part of the method for determining whether the input signal is anomalous or normal. Alternatively, it may also be understood as obtaining the machine learning system from some source that provides the machine learning system as trained according to the method proposed above, e.g., by downloading the machine learning system and/or parameters of the machine learning system from the internet.

An input signal can be considered as normal if it is not anomalous.

According to an example embodiment of the present invention, in the method for determining whether the input signal characterizes an anomaly or is normal, the input signal preferably characterizes an internal state of a technical system and/or a state of an environment of a technical system.

The technical system may, for example, be a machine that is equipped with one or multiple sensors to monitor operation of the machine. The sensors may include sensors for measuring a heat, a rotation, an acceleration, an electric current, an electric voltage, and/or a pressure of the machine or parts of the machine. A measurement or a plurality of measurements from the sensor or the sensors may be provided as input signal to the machine learning system.

Alternatively or additionally, the technical system may sense an environment of the technical system by means of one or multiple sensors. The one or multiple sensors may, for example, be a camera, a lidar sensor, a thermal camera, an ultrasonic sensor, a microphone. The technical system may especially be automatically operated based on measurements of these sensors.

The technical system may, for example, be an at least partially automated robot.

Advantageously, determining whether an input signal of the technical system is anomalous or not allows for a safe and/or desirable operation of the technical system.

In case an input signal is determined as anomalous, various counter measures may be employed. For example, operation of the technical system may be halted or handed over to a human operator or the technical system may be brought into a safe state. This ensures that automated operation of the technical system does not lead to severe consequences such as a harmful or dangerous behavior of the technical system that is operated automatically.

Embodiments of the present invention will be discussed with reference to the figures in more detail.

DETAILED DESCRIPTION OF EXAMPLE EMBODIMENTS

Figure 1:
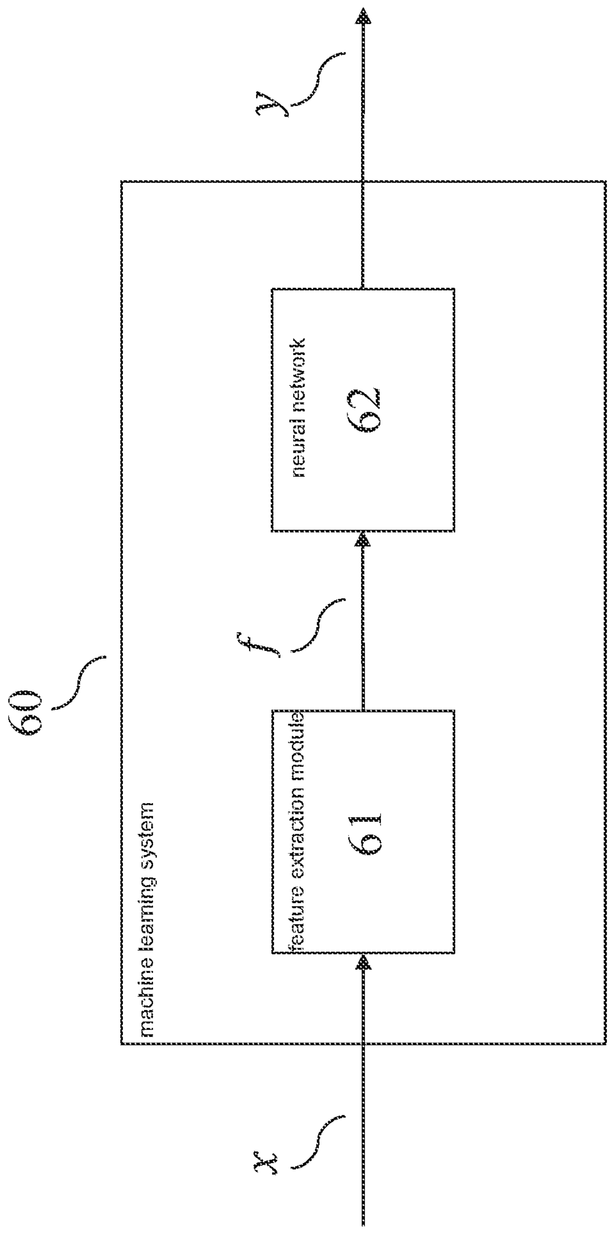
FIG. 1 shows a machine learning system, according to an example embodiment of the present invention.

FIG. 1 shows an embodiment of a machine learning system (60). The machine learning system is configured to accept an input signal (x) as input and provide an output signal (y) as output, wherein the output signal (y) characterizes a likelihood of the input signal (x). Preferably, the input signal (x) is processed by a feature extraction module (61), which is configured to determine a feature representation (f) for the input signal (x). The feature extraction module (61) is preferably a neural network, e.g., a neural network trained according to the MOCO paradigm.

The feature representation is then provided to a neural network (62), which is configured to determine the output signal (y). The neural network (62) may preferably be a normalizing flow or a variational autoencoder but other machine learning models capable of determining a likelihood (or density) are possible as well.

In further embodiments (not shown), the machine learning system (60) is a neural network configured for accepting the input signal (x) and providing the output signal (y).

Figure 2:
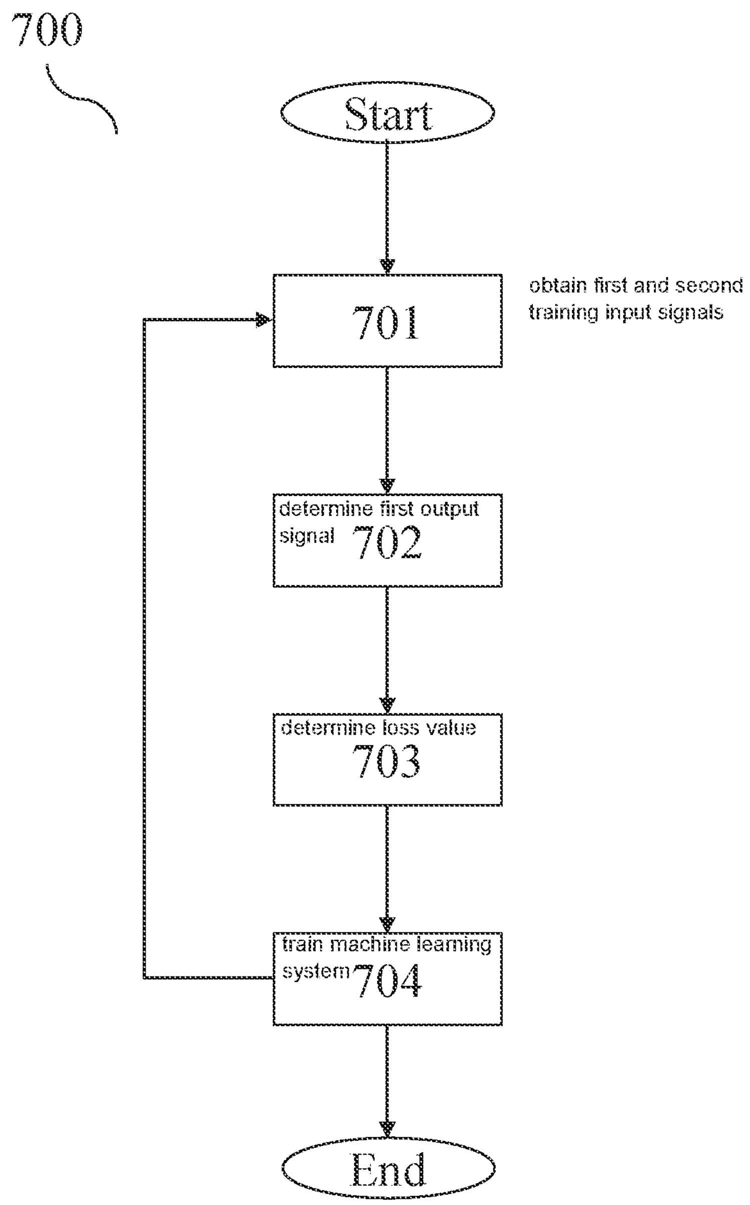
FIG. 2 schematically a method for training the machine learning system, according to an example embodiment of the present invention.

FIG. 2 schematically shows a method (700) for training the machine learning system (60). In a first step (701) of the method (700) a first training input signal and a second training input signal may be obtained, wherein the first training input signal characterizes an in-distribution signal and the second training input signal characterizes a contrastive signal. Preferably, a plurality of first training input signals and second training input signals are obtained.

In a second step (702), a respective first output signal is determined for each first input signal by providing the respective first input signal to the machine learning system (60) and a respective second output signal is determined for each second output signal by providing the respective second output signal to the machine learning system. The plurality of first training input signal or first training input signals and the plurality of second training input signal or second training input signals can be understood as a batch provided to the machine learning system (60), thereby determining one output signal for each input signal in the batch.

In a third step (703), a loss value is determined based on the determined output signals. The loss value is preferably determined according to a loss function $$L = \frac{1}{n}\sum_{i=1}^{n}\left[-\log p_\theta\left(x_1^{(i)}\right)\right] - \frac{1}{m}\sum_{j=1}^{m}\left[-\log p_\theta\left(x_2^{(j)}\right)\right],$$

wherein n is the amount signals in the plurality of first training inputs signals, m is the amount of signals in the plurality of second training input signals, $p_\theta(\cdot)$ indicates performing inference on the machine learning system (60) parametrized by parameters θ for an input signal (i.e., determining a likelihood of the input signal by means of the machine learning system (60)), $$x_1^{(i)}$$

is the i-th signal from the plurality of first training input signals, and $$x_2^{(j)}$$

is the j-the signal from the plurality of second training input signals. The value L is the loss value determined from the loss function.

In a fourth step (704), the machine learning system is trained based on the loss value. This is preferably achieved by means of a gradient-descent method, e.g., stochastic gradient descent or Adam, on the loss value with respect to parameters of the machine learning system (60). Alternatively, it is also possible to use other optimization methods such as evolutionary algorithms or second order optimization methods.

The steps one (701) to four (704) may be repeated iteratively until a predefined amount of iterations has been conducted or until a loss value on a separate validation dataset is at or below a predefined threshold. Afterwards, the method ends.

Figure 3:
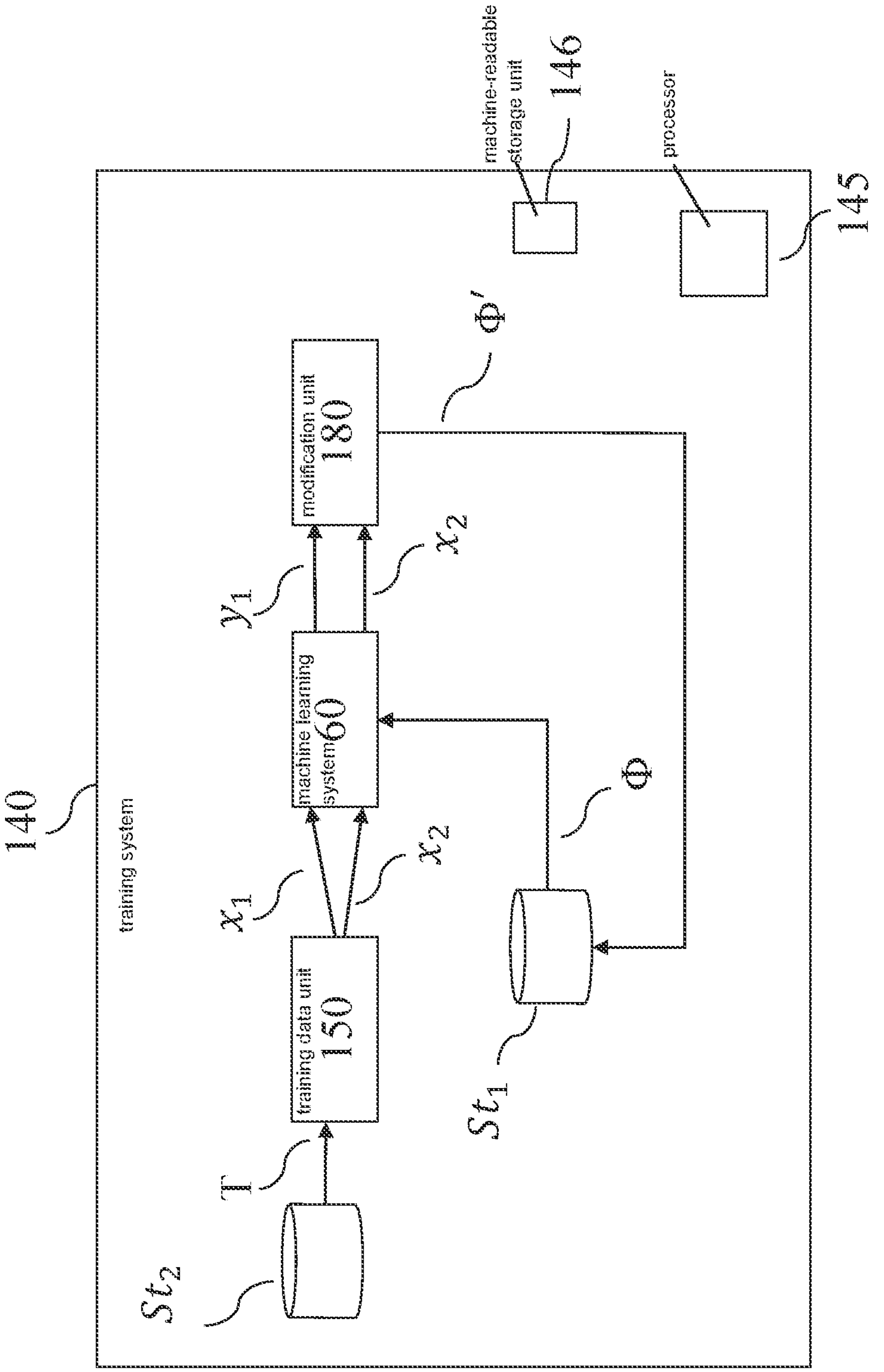
FIG. 3 shows a training system executing the method for training, according to an example embodiment of the present invention.

FIG. 3 shows an embodiment of a training system (140) configured for executing the training method depicted in FIG. 2. For training, a training data unit (150) accesses a computer-implemented database ($St_2$), the database ($St_2$) providing a training data set (T) of first training input signals ($x_1$) and optionally second training input signals ($x_2$). The training data unit (150) determines from the training data set (T) preferably randomly at least one first training input signal ($x_1$) and at least one second training input signal ($x_2$). If the training data set (T) does not comprise a second training input signal ($x_2$), the training data unit may be configured for determining the at least one second training input signal ($x_2$), e.g., by applying a small augmentation to the first training input signal ($x_1$).

Preferably, the training data unit (150) determines a batch comprising a plurality of first training input signals ($x_1$) and second training input signals ($x_2$).

The training data unit (150) transmits the first training input signal ($x_1$) and the second training input signal ($x_2$) or the batch of first training input signals ($x_1$) and second training input signals ($x_2$) to the machine learning system (60). The machine learning system (60) determines an output signal ($y_1$, $y_2$) for each input signal ($x_1$, $x_2$) provided to the machine learning system (60).

The determined output signals ($y_1$, $y_2$) are transmitted to a modification unit (180).

The modification unit (180) determines a loss value according to the formula presented above. The modification unit (180) then determines the new parameters (Φ') of the machine learning system (60) based on the loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters (Φ') determined in a previous iteration are used as parameters (Φ) of the machine learning system (60).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 4:
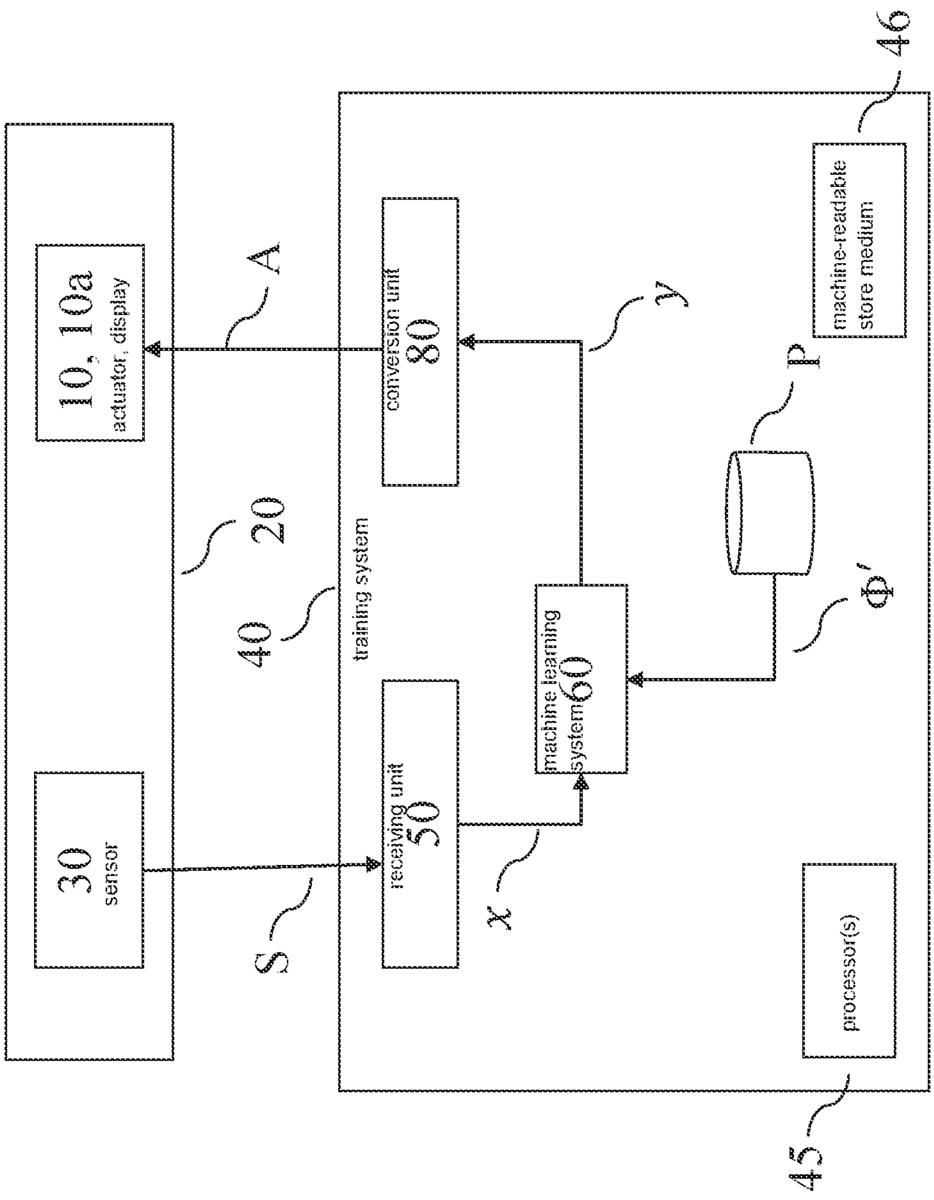
FIG. 4 shows a control system comprising a trained machine learning system controlling an actuator in its environment, according to an example embodiment of the present invention.

FIG. 4 shows an embodiment of control system (40) configured to control an actuator (10) in its environment (20) based on an output signal (y) of the machine learning system (60). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal(S) of the sensor (30) (or in case the sensor (30) comprises a plurality of sensors, an output signal(S) for each of the sensors) which encodes the sensed condition is transmitted to the control system (40).

Thereby, the control system (40) receives a stream of sensor signals(S). It then computes a series of control signals (A) depending on the stream of sensor signals(S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal(S) may directly be taken as an input signal (x). The input signal (x) may, for example, be given as an excerpt from the sensor signal(S). Alternatively, the sensor signal(S) may be processed to yield the input signal (x). In other words, the input signal (x) is provided in accordance with the sensor signal(S). The input signal (x) is then passed on to the machine learning system (60).

The machine learning system (60) is parametrized by parameters (Φ), which are stored in and provided by a parameter storage ($St_1$).

The machine learning system (60) determines an output signal (y) from the input signals (x). The output signal (y) is transmitted to an optional conversion unit (80), which converts the output signal (y) into the control signals (A). Preferably, the conversion unit (80) compares the likelihood characterizes by the output signal (y) to a threshold for deciding whether the input signal (x) characterizes an anomaly. The control unit (80) may determine the input signal (x) to be anomalous if the likelihood is equal to or below the predefined threshold. If the input signal (x) is determined to characterize an anomaly, the control signal (A) may direct the actuator (10) to halt operation, conduct measures for assuming a safe state or hand control of the actuator over to a human operator.

The actuator (10) receives control signals (A), is controlled accordingly, and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise the actuator (10).

In still further embodiments, it can be envisioned that the control system (40) controls a display (10*a*) instead of or in addition to the actuator (10). The display may, for example, show a warning message in case an input signal (x) is determined to characterize an anomaly.

Furthermore, the control system (40) may comprise at least one processor (45) and at least one machine-readable storage medium (46) on which instructions are stored which, if carried out, cause the control system (40) to carry out a method according to an aspect of the present invention.

Figure 5:
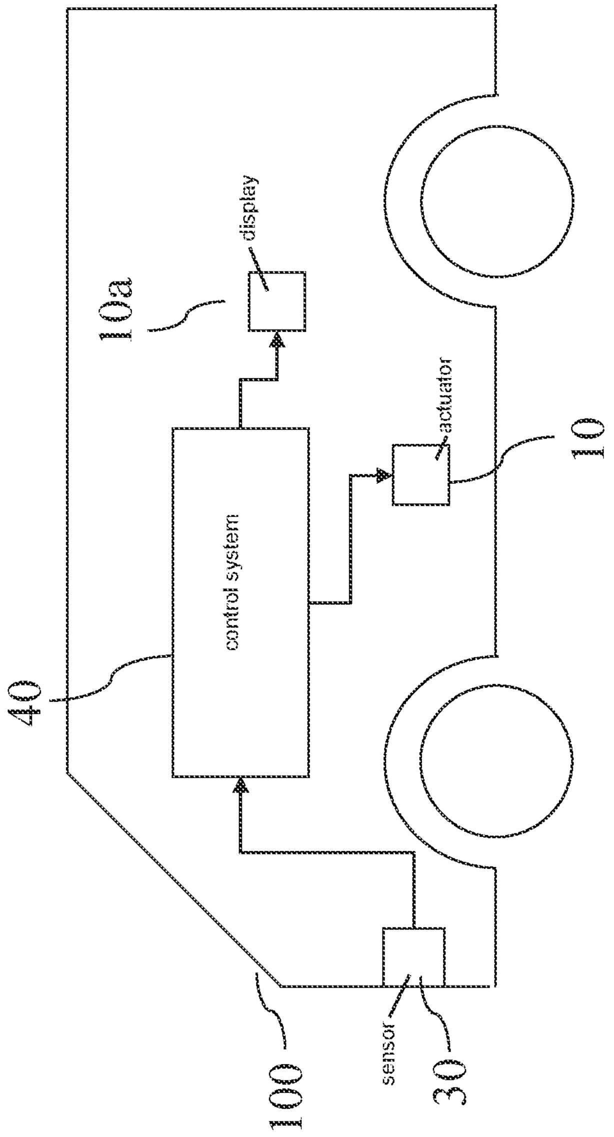
FIG. 5 shows the control system controlling an at least partially autonomous robot, according to an example embodiment of the present invention.

FIG. 5 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100). The control system (40) may comprise further components (not shown) configured for operating the vehicle (100) at least partially automatically, especially based on the sensor signal (S) from the sensor (30).

The control system (40) may, for example, comprise an object detector, which is configured to detect objects in the vicinity of the at least partially autonomous robot based on the input signal (x). An output of the object detector may comprise an information, which characterizes where objects are located in the vicinity of the at least partially autonomous robot. The actuator (10) may then be controlled automatically in accordance with this information, for example to avoid collisions with the detected objects.

The actuator (10), which is preferably integrated in the vehicle (100), may be given by a brake, a propulsion system, an engine, a drivetrain, or a steering of the vehicle (100). The detected objects may also be classified according to what the object detector deems them most likely to be, e.g., pedestrians or trees, and the actuator (10) may be controlled depending on the classification. If the input signal (x) is determined as anomalous, the vehicle (100) may be steered to a side of the road it is travelling on or into an emergency lane or operation of the vehicle (100) may be handed over to a driver of the vehicle or an operator (possibly a remote operator) or the vehicle (100) may execute an emergency maneuver such as an emergency brake.

In further embodiments, the at least partially autonomous robot may be given by another mobile robot (not shown), which may, for example, move by flying, swimming, diving, or stepping. The mobile robot may, inter alia, be an at least partially autonomous lawn mower, or an at least partially autonomous cleaning robot.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine.

Figure 6:
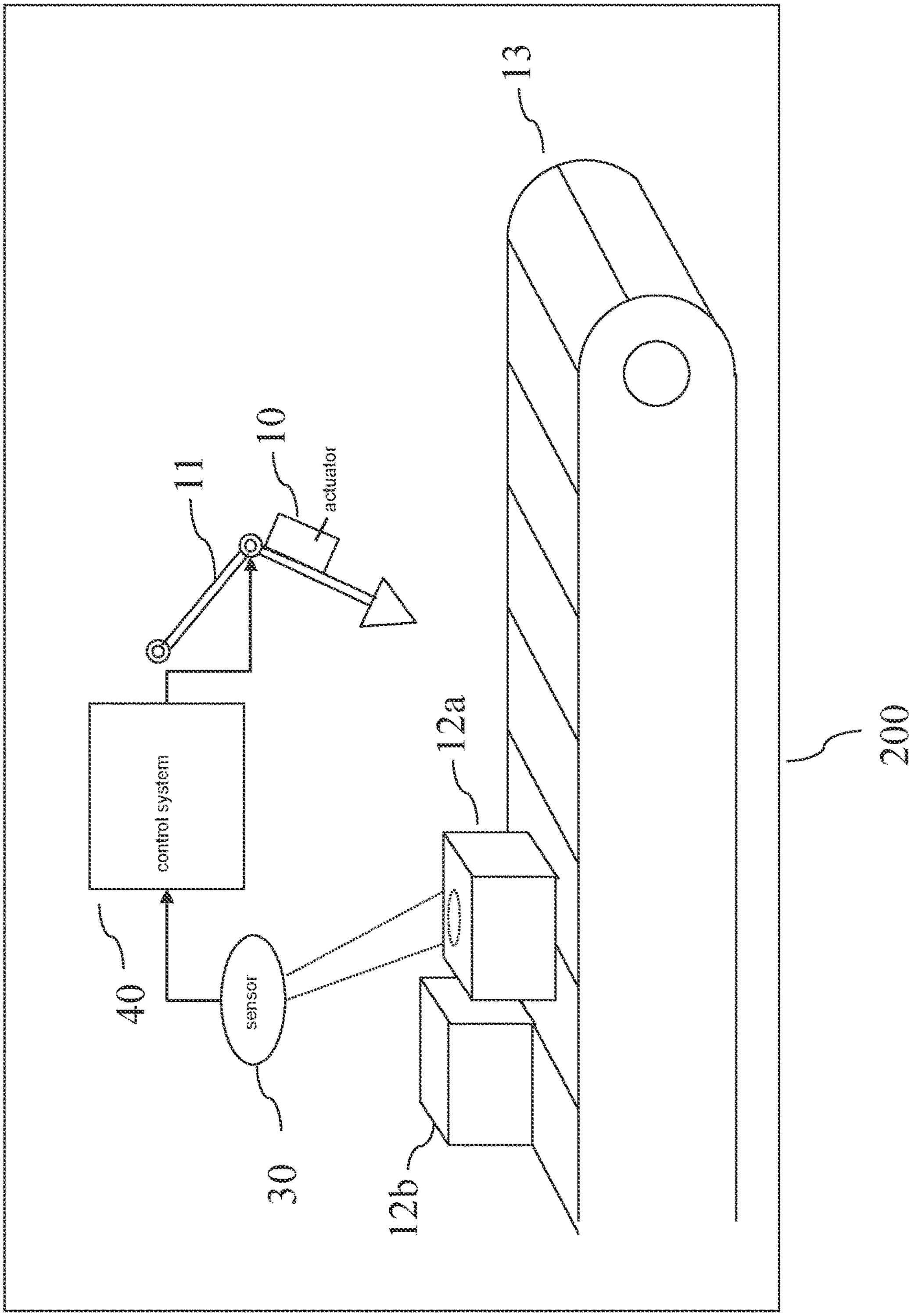
FIG. 6 shows the control system controlling a manufacturing machine, according to an example embodiment of the present invention.

FIG. 6 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12.

Figure 7:
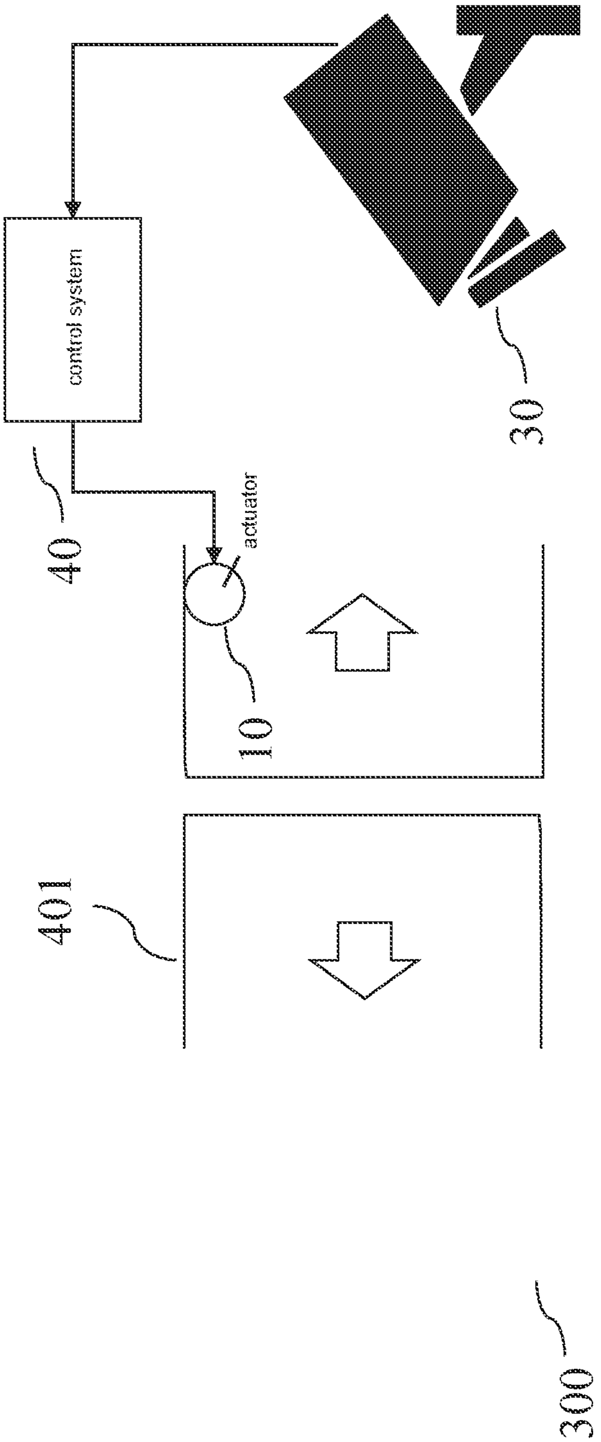
FIG. 7 shows the control system controlling an access control system, according to an example embodiment of the present invention.

An image classifier (not shown) of the control system (40) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be envisioned that the image classifier classifies, whether the manufactured product is broken or exhibits a defect. The actuator (10) may then be controlled as to remove the manufactured product from the transportation device. In the input signal (x) is determined to be anomalous, FIG. 7 shows an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face.

Figure 8:
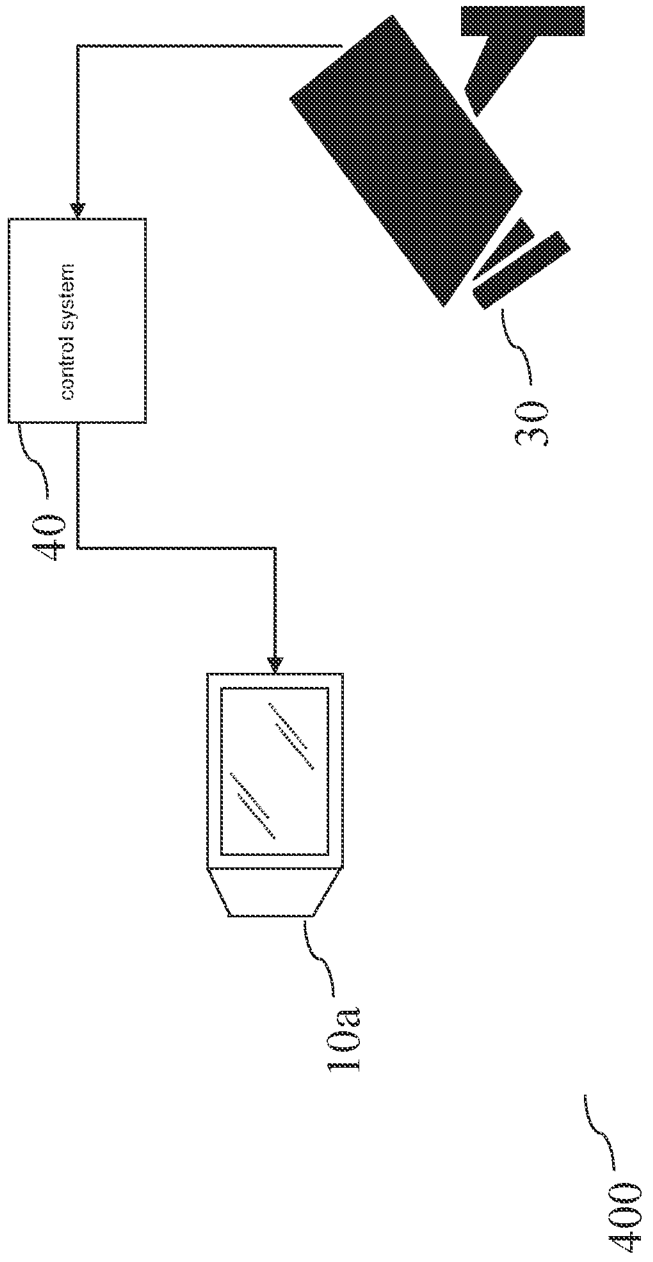
FIG. 8 shows the control system controlling a surveillance system, according to an example embodiment of the present invention.

FIG. 8 shows an embodiment in which the control system (40) controls a surveillance system (400). This embodiment is largely identical to the embodiment shown in FIG. 7. Therefore, only the differing aspects will be described in detail. The sensor (30) is configured to detect a scene that is under surveillance. The control system (40) does not necessarily control an actuator (10) but may alternatively control a display (10*a*). For example, the conversion unit (80) may determine whether the scene detected by the sensor (30) is normal or whether the scene exhibits an anomaly. The control signal (A), which is transmitted to the display (10*a*), may then, for example, be configured to cause the display (10*a*) to adjust the displayed content dependent on the determined classification, e.g., to highlight an object that is deemed anomalous.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for training a machine learning system, wherein the machine learning system is configured to determine an output signal characterizing a probability density of an input signal, the method for training comprises the following steps:

obtaining a first training input signal and a second training input signal, wherein the first training input signal characterizes an in-distribution signal and the second training input signal characterizes a contrastive signal;

determining, by the machine learning system, a first output signal characterizing a probability density of the first training input signal, and determining, by the machine learning system, a second output signal characterizing a probability density of the second training input signal;

determining a loss value, wherein the loss value characterizes a difference between the first output signal and the second output signal; and training the machine learning system based on the loss value.

2. The method according to claim 1, wherein the loss value is determined by:

determining a plurality of first output signals for a corresponding plurality of first training input signals;

determining a plurality of second output signals for a corresponding plurality of second training input signals;

determining the loss value based on a difference of a mean of the plurality of first output signals and a mean of the plurality of second output signals.

3. The method according to claim 2, wherein the loss value is determined according to a loss function, wherein the loss function is characterized by the following formula:

$$L = \frac{1}{n}\sum_{i=1}^{n}\left[-\log p_\theta\left(x_1^{(i)}\right)\right] - \frac{1}{m}\sum_{j=1}^{m}\left[-\log p_\theta\left(x_2^{(j)}\right)\right],$$

wherein n is an amount signals in the plurality of first training inputs signals, m is the amount of signals in the plurality of second training input signals, $p_\theta(\cdot)$ indicates performing inference on the machine learning system parametrized by parameters θ for an input signal, $$x_1^{(i)}$$

is the t-th signal from the plurality of first training input signals, and $$x_2^{(j)}$$

is the j-th signal from the plurality of second training input signals.

4. The method according to claim 1, wherein the input signal the machine learning system is configured to process, includes a signal obtained based on a sensor signal.

5. The method according to claim 1, wherein the second training input signal is obtained by augmenting the first training input signal.

6. The method according to claim 1, wherein the machine learning system includes a feature extraction module, which is configured to determine a feature representation from a respective input signal provided to the machine learning system and a corresponding output signal is determined based on the feature representation extracted for the respective input signal.

7. The method according to claim 6, wherein as part of the training method, the feature extraction module is trained to map similar input signals to similar feature representations.

8. The method according to claim 1, wherein: (i) the machine learning system is a neural network including a normalizing flow or a variational autoencoder or a diffusion model, or (ii) the machine learning system includes a neural network configured to determine an output signal based on a feature representation.

9. The method according to claim 1, wherein the steps of the method are repeated iteratively, wherein in each iteration, the loss value characterizes either the first output signal or a negative of the second output signal, and the training includes at least one iteration in which the loss value characterizes the first output signal, and at least one iteration in which the loss value characterizes the second output signal.

10. The method according to claim 1, wherein the difference is a normalized difference between the probability density of the first training signal and the probability density of the second training signal.

11. A computer-implemented method for determining whether an input signal is anomalous or normal, the method comprising the following steps:

obtaining a machine learning system, wherein the machine learning system has been trained by:

obtaining a first training input signal and a second training input signal, wherein the first training input signal characterizes an in-distribution signal and the second training input signal characterizes a contrastive signal, determining, by the machine learning system, a first output signal characterizing a probability density of the first training input signal, and determining, by the machine learning system, a second output signal characterizing a probability density of the second training input signal, determining a loss value, wherein the loss value characterizes a difference between the first output signal and the second output signal, and training the machine learning system based on the loss value;

determining an output signal based on the input signal using the machine learning system, wherein the output signal characterizes a likelihood probability density of the input signal;

when the probability density characterized by the output signal is equal to or below a predefined threshold, determining the input signal as anomalous, otherwise determining the input signal as normal.

12. The method according to claim 11, wherein the input signal characterizes an internal state of a technical system and/or a state of an environment of a technical system.

13. The method according to claim 11, wherein the difference is a normalized difference between the probability density of the first training signal and the probability density of the second training signal.

14. A machine learning system, wherein the machine learning system is trained by:

obtaining a first training input signal and a second training input signal, wherein the first training input signal characterizes an in-distribution signal and the second training input signal characterizes a contrastive signal;

determining, by the machine learning system, a first output signal characterizing a probability density of the first training input signal, and determining, by the machine learning system, a second output signal characterizing a probability density of the second training input signal;

determining a loss value, wherein the loss value characterizes a difference between the first output signal and the second output signal; and training the machine learning system based on the loss value.

15. The machine learning system according to claim 14, wherein the difference is a normalized difference between the probability density of the first training signal and the probability density of the second training signal.

16. A training system configured to training a machine learning system, wherein the machine learning system is configured to determine an output signal characterizing a probability density of an input signal, the training system being configured to:

obtain a first training input signal and a second training input signal, wherein the first training input signal characterizes an in-distribution signal and the second training input signal characterizes a contrastive signal;

determine, by the machine learning system, a first output signal characterizing a probability density of the first training input signal, and determine, by the machine learning system, a second output signal characterizing a probability density of the second training input signal;

determine a loss value, wherein the loss value characterizes a difference between the first output signal and the second output signal; and train the machine learning system based on the loss value.

17. The training system according to claim 16, wherein the difference is a normalized difference between the probability density of the first training signal and the probability density of the second training signal.

18. A non-transitory computer-readable medium on which is stored a computer program for training a machine learning system, wherein the machine learning system is configured to determine an output signal characterizing a probability density of an input signal, the computer program, when executed by a processor, causing the processor to perform the following steps:

obtaining a first training input signal and a second training input signal, wherein the first training input signal characterizes an in-distribution signal and the second training input signal characterizes a contrastive signal;

determining, by the machine learning system, a first output signal characterizing a probability density of the first training input signal, and determining, by the machine learning system, a second output signal characterizing a probability density of the second training input signal;

determining a loss value, wherein the loss value characterizes a difference between the first output signal and the second output signal; and training the machine learning system based on the loss value.

19. The non-transitory computer-readable medium according to claim 18, wherein the difference is a normalized difference between the probability density of the first training signal and the probability density of the second training signal.

* * * * *